(12) United States Patent
Foltz et al.

(10) Patent No.: US 6,356,864 B1
(45) Date of Patent: Mar. 12, 2002

(54) METHODS FOR ANALYSIS AND EVALUATION OF THE SEMANTIC CONTENT OF A WRITING BASED ON VECTOR LENGTH

(75) Inventors: Peter William Foltz, Las Cruces, NM (US); Thomas K. Landauer, Boulder, CO (US); Robert Darrell Laham, II, Boulder, CO (US); Walter Kintsch, Boulder, CO (US); Robert Ernest Rehder, Boulder, CO (US)

(73) Assignee: University Technology Corporation, Boulder, CO (US)

( * ) Notice: Subject to any disclaimer, the term of this patent is extended or adjusted under 35 U.S.C. 154(b) by 0 days.

(21) Appl. No.: 09/121,450

(22) Filed: Jul. 23, 1998

Related U.S. Application Data

(60) Provisional application No. 60/053,725, filed on Jul. 25, 1997.

(51) Int. Cl.[7] .................................................. G06F 17/27
(52) U.S. Cl. ................................ 704/1; 704/9; 434/353
(58) Field of Search .................... 704/1, 9, 10; 707/530, 707/531, 532, 1, 2, 6, 100, 101, 104; 434/322, 350, 352, 118, 353, 362

(56) References Cited

U.S. PATENT DOCUMENTS

| | | | |
|---|---|---|---|
| 4,773,009 A | * 9/1988 | Kucera et al. | ............... 707/531 |
| 4,839,853 A | 6/1989 | Deerwester et al. | ........... 707/5 |
| 4,930,077 A | * 5/1990 | Fan | ............................... 704/8 |
| 4,978,305 A | * 12/1990 | Kraft | .......................... 434/353 |
| 5,259,766 A | * 11/1993 | Sack et al. | .................. 434/362 |

(List continued on next page.)

OTHER PUBLICATIONS

Foltz et al., "Reasoning from Multiple Texts: An automatic analysis of readers' situation models", Proceedings at the 18th Annual Conference of the Cognitive Science Conference, Jul. 1996, pp. 110–115.

Dumais et al., "Automating the Assignment of Submitted Manuscripts to Reviewers", Proceedings of the ACM SIGIR'92 15th International Conference on Research and Development in Information Retrieval, Jun. 1992, pp. 233–244.

Landauer et al., "Latent Semantic Analysis and the Measurement of Knowledge", Educational Testing Service Conference on Natural Language Processing Techniques and Technology in Assessment and Education, 1994, pp. 127–141.

(List continued on next page.)

*Primary Examiner*—Joseph Thomas
(74) *Attorney, Agent, or Firm*—Lathrop & Gage L.C.; Daniel N. Fishman

(57) ABSTRACT

The present invention is a methodology for analyzing and evaluating a sample text, such as essay(s), or document(s). This methodology compares sample text to a reference essay(s), document(s), or text segment(s) within a reference essay or document. The methodology analyzes the amount of subject-matter information in the sample text, analyzes the relevance of subject matter information in the sample and evaluates the semantic coherence of the sample. This methodology presumes there is an underlying, latent semantic structure in the usage of words. The method parses and stores text objects and text segments from the sample text and reference text into a two-dimensional data matrix. A weight is computed for each text object and applied to each data matrix cell value. The method performs a singular value decomposition on the data matrix, which produces three trained matrices. The method computes a vector representation of the sample text and reference text using the three trained matrices. The methodology compares the sample text to the reference text by computing the cosine between the vector representation of the sample text and the vector representation of the standard reference text. Alternatively, the dot product is used to compare the sample text to the standard reference text. A grade is assigned to the sample text based on the degree of similarity between the sample text and the standard reference text.

45 Claims, 9 Drawing Sheets

U.S. PATENT DOCUMENTS

| | | | | |
|---|---|---|---|---|
| 5,301,109 A | * | 4/1994 | Landauer et al. | 704/9 |
| 5,317,507 A | | 5/1994 | Gallant | 707/532 |
| 5,325,298 A | | 6/1994 | Gallant | 704/9 |
| 5,371,807 A | * | 12/1994 | Register et al. | 382/159 |
| 5,418,948 A | | 5/1995 | Turtle | 707/4 |
| 5,619,709 A | * | 4/1997 | Caid et al. | 707/532 |
| 5,794,178 A | * | 8/1998 | Caid et al. | 704/9 |
| 5,987,446 A | * | 11/1999 | Corey et al. | 707/3 |
| 6,115,683 A | * | 9/2000 | Burstein et al. | 704/1 |

OTHER PUBLICATIONS

Foltz, Peter W., "Latent semantic analysis for text–based research", Behavior Research Methods, Instruments, & Computers, 1996, vol. 28(2), pp. 197–202.

Landauer et al.,"A Solution to Plato's Problem: The Latent Semantic Analysis Theory of Acquistion, Induction and Representation of Knowledge", Psychological Review, 1997, vol. 104, No. 2, pp. 211–240.

* cited by examiner

METHODS FOR ANALYSIS AND EVALUATION OF THE SEMANTIC CONTENT OF A WRITING BASED ON VECTOR LENGTH

This application claims benefit of Provisional No. 60/053,725, filed Jul. 25, 1997.

BACKGROUND OF THE INVENTION

1. Field of the Invention

This invention relates to methods that compute the quality of a text that purports to convey information on a topic by computing the amount of relevant subject-matter contained in the sample text and by computing the similarity of that subject-matter information to that contained in at least one standard reference text.

2. Description of Related Art

A need exists, in the educational field, to automate the process of evaluating the quality of essays. No automated process exists for providing quick evaluation of a student's subject matter knowledge and ability to articulate that knowledge in writing. An essay tests the depth of the writer's subject-matter knowledge, and ability to express ideas, but currently no automatic process exists for a quick and through evaluation of the essay.

Currently, the process of grading an essay with regard to quality and quantity of subject matter information and semantic coherence is labor intensive, tedious, and subjective. Whether the essay is written for an in-class project, in-dass test, during a nation-wide admissions test or an assessment test, each person grading an essay spends time analyzing the quality and quantity of subject matter content. Often two graders will compute different scores for the same essay. A need exists for a fair and objective method to grade essays, but the method must also reduce the amount of time spent grading the essay. In addition, this method must be as reliable and accurate as a grade a teacher, professional exam grader, or subject matter expert would assign to the text.

Related automated systems evaluate text with respect to spelling, grammar, sentence length, number of sentences within a paragraph, frequency of words, and total number of words written. These systems do not evaluate the text based on the amount and relevance of subject matter information, and coherence of the writing. Sentences within a paragraph can be grammatically correct, but these sentences can fail to answer the question presented or follow any coherent structure. In addition, these systems do not diagnose and provide information indicating which components of subject matter the essay should or should not contain, and indicate the weak areas in an essay.

Several automated systems use natural language queries for document retrieval. These systems match the words or phrases within the query to documents within a database. The query result lists in descending order the name of documents that contain the greatest number or some other function of the combination of words within the query. Other automated document retrieval systems develop information based on word proximity and importance of the word. If different words are used in query and text, these automated systems cannot evaluate the text based on the amount and relevance of subject matter information, without the addition of intellectually created thesauri, or semantic routines.

Latent Semantic Indexing (LSI) is well known in the art. U.S. Pat. No. 4,839,853, issued on Jun. 13, 1989 to Deerwester et al., and U.S. Pat. No. 5,301,109, issued on Apr. 5, 1994 to Landauer et al, utilize Latent Semantic Indexing to model the underlying correlational structure of the distribution of terms in documents. Computer-based document retrieval and multi-language retrieval systems utilize this process to statistically analyze a text database and an information query and estimate the correlation of topical meaning between words in the query and documents within a database. The '853 and '109 patents present a detailed discussion of the mathematics underlying the LSI techniques. There is no teaching in the art regarding the application of LSI to evaluate the relevant quality and quantity of semantic-content or the coherence of a writing.

SUMMARY OF THE INVENTION

This present invention solves the above and other problems, thereby advancing the useful arts, by providing an automated method for analysis and evaluation of semantic content of text. This method does not utilize conventional expert systems, artificial intelligence, or natural language processing. Instead, this method uses statistical analysis, hereinafter Latent Semantic Analysis (LSA) (based in part on known LSI methods), to analyze a corpus of representative text and thereafter to evaluate a sample text, such as an essay. This method assigns a numerical score or grade to a sample text. This score is based on the quality, quantity and relevance of subject matter content in the sample text as compared to one or more standard references, and in some cases aspects of the coherence of the writing.

This invention presumes there is an underlying latent semantic structure in the usage of words that is not easily evident due to the variety of words in our vocabulary that have similar meanings. The variety of words in our vocabulary gives the writer great flexibility to express concepts. The words the writer chooses depends upon the writer's experience or education. Consequently, two writers may choose different words to describe similar information on a particular subject matter topic. This latent semantic structure can be expressed mathematically. A mathematical relation can be computed to determine the relevant variety of words that express a particular topic.

LSA uses a data matrix comprising words and passages of sufficient length to express a full idea. LSA statistically analyzes this body of information in the data matrix to mathematically determine direct and indirect relationships between the words and the various contexts of the words. The statistical analysis provides a trained set of matrices from which all sample texts can be compared to estimate the quality, quantity, and relevance of subject matter content in the each sample text. Additionally, the coherence of the writing in a sample text is also estimated using LSA.

LSA ignores the order of words within the passage, and defines the meaning of a passage as the average of the vectors of the words it contains. Specifically, LSA computes the sum of each word in each vector representing the passage then computes the average of this value. The meaning of the passage can be similarly computed as the sum of the vectors of the words the passage contains. This definition represents the passage as a single vector. The passage can be a phrase, a paragraph, a portion of a text, or the whole text.

Specifically, this invention uses a set of reference documents to create a data matrix which defines the domain of knowledge. Reference documents, for example, can be authoritative text on the subject-matter, the text used to learn the subject-matter, articles on the subject-matter, or essays written by fellow students.

A data matrix is created from unique terms used in two or more reference documents. Terms are referred to as text objects and are used to form rows, the first dimension, within the data matrix. Text objects are unique words, concepts, or phrases. In the data matrix, each element of the text object vector represents of the number of times the text object is used in two or more reference documents.

A segment vector represents the individual reference documents. The segment vector is used to form columns, the second dimension, within the data matrix. A segment vector, for example, can be an entire reference text, abstract of a reference text, title of a reference text, at least one paragraph of a reference text, at least one sentence of a reference text, or a collection of text objects that convey an idea or summarize a topic. Each reference text is associated with a single segment vector within the data matrix.

The intersection of a row and column, a matrix cell, contains the number of times a particular text object appears in a particular segment. A weighted value is applied to each cell value. The resulting cell is a proportional representation of the importance of the cells original information, for example, rare words are weighted more heavily.

Singular value decomposition is applied to the data matrix to decompose the data matrix into three trained matrices. The first trained matrix consists of the original row (text object) identities and columns of orthogonal derived factor values. The second trained matrix consists of the original column (segment) identities and rows of orthogonal derived factor values. The third trained matrix consists of a diagonal matrix containing scaling values. The number of dimensions in these trained matrices is then reduced by setting the smallest values in the scaling matrix to zero. Applying matrix multiplication to these three matrices provides a reduced dimension semantic-space matrix.

Next, the method generates a vector representation of a selected reference text from the plurality of reference text used to create the data matrix. This selected reference text is otherwise known as a standard reference text or is equivalently known as a standard text. The standard reference text is used as a basis of comparison for the ungraded sample text. An average or sum of the text object vectors is computed using each text object within the standard reference text to generate a vector representation of the standard reference text.

The standard reference text may be used along with the plurality of reference texts to create the data matrix. Or, the standard reference text can be read, stored, and parsed after the trained matrices are created.

The student's essay, otherwise known as the ungraded sample text, is parsed into text objects. Next, a pseudo-object vector representation is generated by computing a vector representation of the ungraded sample text.

A pseudo-object vector representation can be computed using two methods. A first method uses the computed semantic-space vector to compute the average of the vector elements the ungraded sample text contains. In an alternative method, the three trained matrices are used to compute the pseudo-object for the ungraded sample text. In this method a vector is computed such that it can be used as any row in the second trained matrix, that is, the document matrix.

The computed pseudo-object of the ungraded sample text is compared against the vector representation of the standard text. The cosine between the pseudo-object vector representation and the vector representation of the standard reference text determines the similarity between both documents. An alternative method to compute the similarity between both documents, comprises computing a dot product between the pseudo-object vector representation and the vector representation of the standard reference text.

The pseudo-object is also used to determine the amount of subject-matter in the student's essay. The amount of knowledge contained in the student's essay is computed as the vector length of the pseudo-object.

To determine the coherence of the student's essay, the essay is divided into portions and a pseudo-object is computed for each portion of the essay. The cosine between the vector representing a first portion and the vector representing the following portion is a measure of the coherence between portions.

This invention provides several features and advantages. One advantage of the present invention is the automation of grading essays with regard to quality and quantity of subject matter information and semantic coherence, thus, reducing the amount of time spent analyzing the quality of information content, and coherence of the writing. Additionally, the essays are graded in a fair and objective manner because the process utilizes the same process for each essay.

Another feature of the present invention provides quick evaluation of a writers subject-matter knowledge and ability to articulate the subject-matter. The automated process allows a testing facility to grade multiple essays written for national essay exams, or computer-based interactive learning situations in less time. An automated grading process diagnoses and provides information indicating which components of subject matter the essay should or should not contain, indicates the weak areas in an essay, and identifies the paragraphs and sentences in the text which are not on topic.

This invention also provides a grade as reliable and accurate as a grade a teacher, professional exam grader, or subject matter expert would assign to the text. Experiments indicate this automated process predicts comparable grades for carefully constructed objective tests, as accurately as those received from human graders. These results are not attributable to how many technical or unusual words the writer uses.

The above and other benefits, aspects, features, and advantages of the present invention will become apparent from the following description and the attached drawings.

DETAILED DESCRIPTION OF THE PREFERRED EMBODIMENTS

Figure 1:
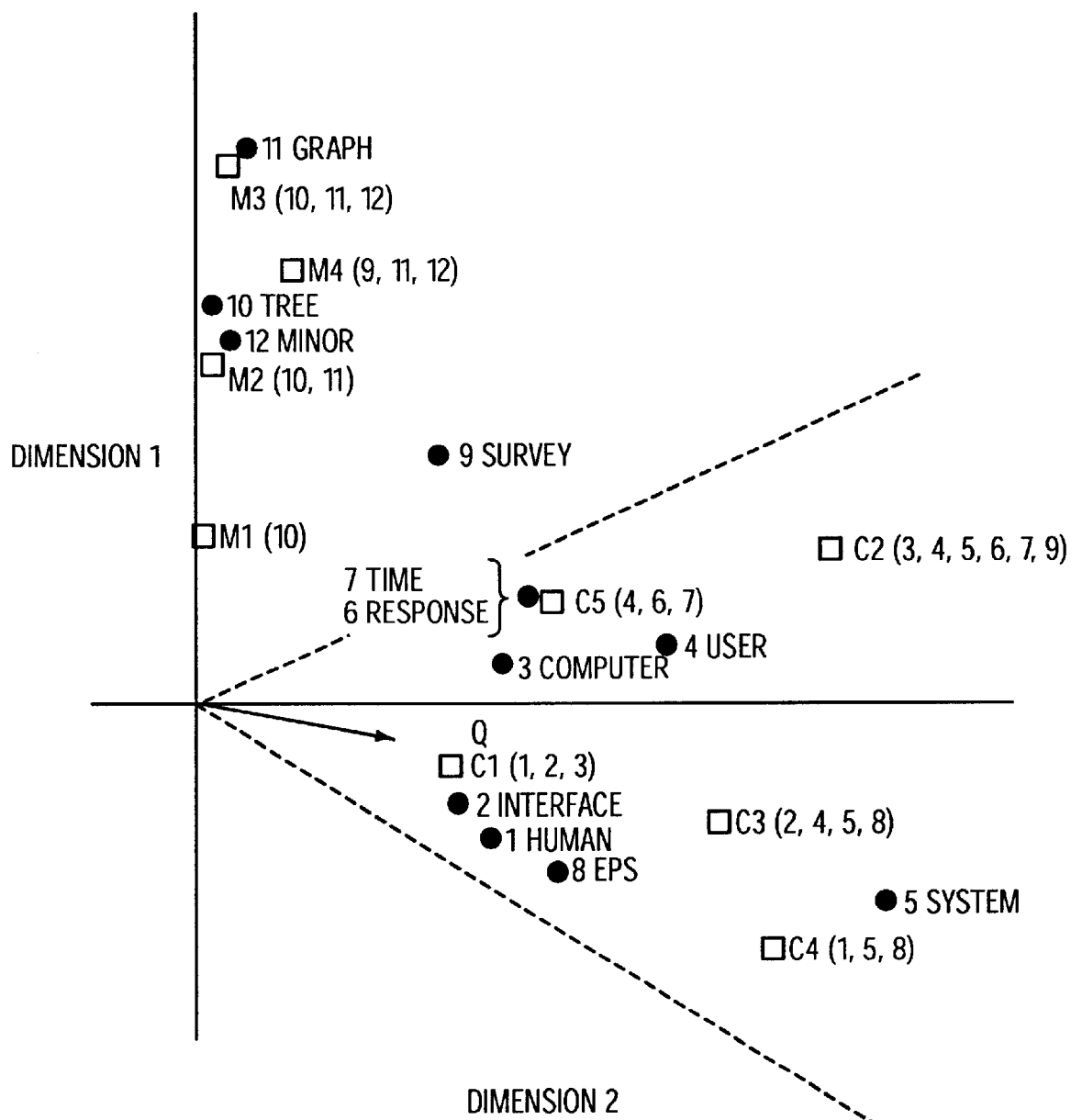
FIG. 1 is a plot of the "term" coordinates and the "document" coordinates based on a two-dimensional singular value decomposition of an original "term-by-document" matrix.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Illustrative Example of the LSI Method

Before discussing the principles and operational characteristics of this invention in detail, it is helpful to present a motivating example of latent semantic analysis. This also aids in introducing terminology utilized later in the discussion.

The contents of Table 1 are used to illustrate how semantic structure analysis works.

TABLE 1

Document Set Based on Titles

| Title | Content |
|---|---|
| c1 | Human machine interface for Lab ABC computer applications |
| c2 | A survey of user opinion of computer system response time |
| c3 | The EPS user interface management system |
| c4 | Systems and human systems engineering testing of EPS-2 |
| c5 | Relation of user-perceived response time to error measurement |
| m1 | The generation of random, binary, unordered trees |
| m2 | The intersection graph of paths in trees |
| m3 | Graph minors IV |
| m4 | Graph minors |

In this example, a file of text objects consists of nine titles of technical documents with titles c1–c5 concerned with human/computer interaction and titles m1–m4 concerned with mathematical graph theory. In Table 1, words occurring in more than one title are bolded. Using conventional keyword retrieval, if a user requested papers dealing with "human computer interaction," titles c1, c2, and c4 would be returned, since these titles contain at least one keyword from the user request. However, c3 and c5, while related to the query, would not be returned since they share no words in common with the request. It is now shown how latent semantic structure analysis treats this request to return titles c3 and c5.

Table 2 depicts the "term-by-document" matrix for the 9 technical document titles. Each cell entry, (i,j), is the frequency of occurrence of term i in document j. This basic term-by-document matrix or a mathematical transformation thereof is used as input to the statistical procedure described below.

TABLE 2

| Terms | c1 | c2 | c3 | c4 | c5 | m1 | m2 | m3 | m4 |
|---|---|---|---|---|---|---|---|---|---|
| Human | 1 | 0 | 0 | 1 | 0 | 0 | 0 | 0 | 0 |
| Interface | 1 | 0 | 1 | 0 | 0 | 0 | 0 | 0 | 0 |
| Computer | 1 | 1 | 0 | 0 | 0 | 0 | 0 | 0 | 0 |
| User | 0 | 1 | 1 | 0 | 1 | 0 | 0 | 0 | 0 |
| System | 0 | 1 | 1 | 0 | 1 | 0 | 0 | 0 | 0 |
| Response | 0 | 1 | 0 | 0 | 1 | 0 | 0 | 0 | 0 |
| Time | 0 | 1 | 0 | 0 | 1 | 0 | 0 | 0 | 0 |
| EPS | 0 | 0 | 1 | 1 | 0 | 0 | 0 | 0 | 0 |
| Survey | 0 | 1 | 0 | 0 | 0 | 0 | 0 | 0 | 1 |
| Trees | 0 | 0 | 0 | 0 | 0 | 1 | 1 | 1 | 0 |
| Graph | 0 | 0 | 0 | 0 | 0 | 0 | 1 | 1 | 1 |
| Minors | 0 | 0 | 0 | 0 | 0 | 0 | 0 | 1 | 1 |

For this example the documents and terms have been carefully selected to yield a good approximation in just two dimensions for expository purposes. FIG. 1 is a two-dimensional graphical representation of the two largest dimensions resulting from the mathematical process, singular value decomposition. Both document titles and the terms used in them are placed into the same space. Terms are shown as circles and labeled by number. Document titles are represented by squares with the numbers of constituent terms indicated parenthetically. The angle between two objects (terms or documents) describe their computed similarity. In this representation, the two types of documents form two distinct groups: all the mathematical graph theory titles occupy the same region in space (basically along Dimension 1 of FIG. 1) whereas a quite distinct group is formed for human/computer interaction titles (essentially along Dimension 2 of FIG. 1).

Prepare the Data Matrix for Singular Value Decomposition

A weighted value is applied to each cell within the term-by-document of Table 2 before the data matrix undergoes singular value decomposition. The resulting weighted cells are a proportional representation of the importance of the cell's original information, for example, rare words are weighed more heavily.

The weighted value is, for example, computed as the log (individual cell value +1) divided by the text object's entropy value. The weighting equation is:

$$[\log (x_{i,j}+1)]/\text{entropy}$$

where $x_{i,j}$ is the individual cell value. Entropy measures the concentration of possible equivalent text objects over all entries in the text object's row(i) and is computed as follows:

$$[\Sigma(p \log p)]$$

where p is the proportion of text object occurrences in the row(i), and is computed as follows:

$$p_{i,j}=[x_{i,j}]/[\Sigma x(i,j=1,n)]$$

where n is the number of columns in the matrix.

A person skilled in the art will recognize that other weighting methods may be used to compute a proportional representation of the importance of the cell's information.

Description of Singular Value Decomposition

To obtain the data to plot FIG. 1, the weighted data matrix of Table 2 is decomposed using singular value decomposition (SVD). The number of dimensions in the three resulting matrices are reduced by setting the k smallest values in the scaling matrix to zero. The three resulting matrices are known as trained matrices.

A reduced SVD is employed to approximate the original data matrix in terms of a much smaller number of orthogonal dimensions. The three reduced dimensional matrices describe major association structures in the term-document matrix but ignore small variations in word usage. The number of dimensions to represent adequately a particular domain is largely an empirical matter. If the number of dimensions is too large, random noise or variations in word usage will be modeled. If the number of dimensions is too small, significant semantic content will remain uncaptured. For diverse information sources, 100 or more dimensions may be needed.

To illustrate the decomposition technique, the term-by-document matrix, denoted Y, is decomposed into three other matrices, namely, the term matrix (TERM), the document matrix (DOCUMENT), and a diagonal matrix of singular values (DIAGONAL), as follows:

$$Y_{t,d} = \text{TERM}_{t,k} \text{DIAGONAL}_{k,k} \text{DOCUMENT}^T_{k,d}$$

where Y is the original t-by-d matrix, TERM is the t-by-k matrix that has unit-length orthogonal columns, DOCUMENT$^T$ is the transpose of the d-by-k DOCUMENT matrix with unit-length orthogonal columns, and DIAGONAL is the k-by-k diagonal matrix of singular values typically ordered by magnitude.

The dimensionality of the solution, denoted k, is the rank of the t-by-d matrix, that is, $k \leq \min(t,d)$. Tables 3, 4 and 5 below show the TERM and DOCUMENT matrices and the diagonal elements of the DIAGONAL matrix, respectively, as found via SVD.

TABLE 3

TERM MATRIX (12 terms by 9 dimensions)

| Human | .22 | −.11 | .29 | −.41 | −.11 | −.34 | .52 | −.06 | −.41 |
|---|---|---|---|---|---|---|---|---|---|
| Interface | .20 | −.07 | .14 | −.55 | .28 | .50 | −.07 | −.01 | −.11 |
| Computer | .24 | .04 | −.16 | −.59 | −.11 | −.25 | −.30 | .06 | .49 |
| User | .40 | .06 | −.34 | .10 | .33 | .38 | .00 | .00 | .01 |
| System | .64 | −.17 | .36 | .33 | −.16 | −.21 | −.17 | .03 | .27 |
| Response | .27 | .11 | −.43 | .07 | .08 | −.17 | .28 | −.02 | −.05 |
| Time | .27 | .11 | −.43 | .07 | .08 | −.17 | .28 | −.02 | −.05 |
| EPS | .30 | −.14 | .33 | .19 | .11 | .27 | .03 | −.02 | −.17 |
| Survey | .21 | .27 | −.18 | −.03 | −.54 | .08 | −.47 | −.04 | −.58 |
| Tree | .01 | .49 | .23 | .03 | .59 | −.39 | −.29 | .25 | −.23 |
| Graph | .04 | .62 | .22 | .00 | −.07 | .11 | .16 | −.68 | .23 |
| Minor | .03 | .45 | .14 | −.01 | −.30 | .28 | .34 | .68 | .18 |

TABLE 4

DOCUMENT MATRIX (9 documents by 9 dimensions)

| c1 | .20 | −.06 | .11 | −.95 | .04 | −.08 | .18 | −.01 | −.06 |
|---|---|---|---|---|---|---|---|---|---|
| c2 | .60 | .17 | −.50 | −.03 | −.21 | −.02 | −.43 | .05 | .24 |
| c3 | .46 | −.13 | .21 | .04 | .38 | .07 | −.24 | .01 | .02 |
| c4 | .54 | −.23 | .57 | .27 | −.20 | −.04 | .26 | −.02 | −.08 |
| c5 | .28 | .11 | −.50 | .15 | .33 | .03 | .67 | −.06 | −.26 |
| m1 | 0.00 | .19 | .10 | .02 | .39 | −.30 | −.34 | .45 | −.62 |
| m2 | .01 | .44 | .19 | .02 | .35 | −.21 | −.15 | −.76 | .02 |
| m3 | .02 | .62 | .25 | .01 | .15 | .00 | .25 | .45 | .52 |
| m4 | .08 | .53 | .08 | −.02 | −.60 | .36 | .04 | −.07 | −.45 |

TABLE 5

DIAGONAL (9 singular values)

| 3.34 | 2.54 | 2.35 | 1.64 | 1.550 | 1.31 | 0.84 | 0.56 | 0.36 |
|---|---|---|---|---|---|---|---|---|

As alluded to earlier, data to plot FIG. 1 was obtained by presuming that two dimensions are sufficient to capture the major associational structure of the t-by-d matrix, that is, k is set to two in the expression for $Y_{t,d}$, yielding an approximation of the original matrix. Only the first two columns of the TERM and DOCUMENT matrices are considered with the remaining columns being ignored. Thus, the term data point corresponding to "human" in FIG. 1 is plotted with coordinates (0.22,−0.11), which are extracted from the first row and the two left-most columns of the TERM matrix. Similarly, the document data point corresponding to title m1 has coordinates (0.00,0.19), coming from row six and the two left-most columns of the DOCUMENT matrix. Finally, the Q vector is located from the weighted average of the terms "human" and "computer" appearing in the document.

General Model Details

It is now elucidating to describe in somewhat more detail the mathematical model underlying the latent structure, singular value decomposition technique.

Any rectangular matrix Y of t rows and d columns, for example, a t-by-d matrix of terms and documents, can be decomposed into a product of three other matrices:

$$Y = T_o S_o D^T_o \qquad (1)$$

such that $T_o$ and $D_o$ have unit-length orthonormal columns (i.e. $T_o^T T_o = I$; $D_o^T D_o = I$) and $S_o$ is diagonal. This is called the singular value decomposition (SVD) of Y. (A procedure for SVD is described in the text Numerical Recipes, by Press, Flannery, Teukolsky and Vetterling, 1986, Cambridge University Press, Cambridge, England). $T_o$ and $D_o$ are the matrices of left and right singular vectors and $S_o$ is the diagonal matrix of singular values. By convention, the diagonal elements of $S_o$ are ordered in decreasing magnitude.

With SVD, it is possible to devise a simple strategy for an optimal approximation to Y using smaller matrices. The k largest singular values and their associated columns in $T_o$ and $D_o$ may be kept and the remaining entries set to zero. The resulting three matrices are known as the trained matrices. The product of the three trained matrices is the semantic-space matrix $Y_R$, which is approximately equal to Y, and is of rank k. The new matrix $Y_R$ is the matrix of rank k which is the closest in the least squares sense to Y. Since zeros were introduced into $S_o$, the representation of $S_o$ can be simplified by deleting the rows and columns having these zeros to obtain a new diagonal matrix S, and then deleting the corresponding columns of $T_o$ and $D_o$ to define new matrices T and D, respectively. The result is a reduced model such that $$Y_R = TSD^T. \qquad (2)$$

The value of k is chosen for each application; it is generally such that $k \geq 100$ for collections of 1000–3000 data objects.

For discussion purposes, it is useful to interpret the SVD geometrically. The rows of the reduced matrices T and D may be taken as vectors representing the terms and documents, respectively, in a k-dimensional space. With appropriate rescaling of the axes, by quantities related to the associated diagonal values of S, dot products between points in the space can be used to access and compare objects. (A simplified approach which did not involve rescaling was used to plot the data of FIG. 1, but this was strictly for expository purposes.) These techniques are now discussed.

Fundamental Comparisons

For essay grading, the fundamental comparison of interest is comparing two documents, that is, text segments. The comparison of two documents is the dot product between two column vectors of Y. The document-to-document dot product is approximated by $$Y^T_R Y_R = (TSD^T)^T(TSD^T) = DS^2 D^T = (DS)(DS)^T. \qquad (3)$$

Thus the rows of the DS matrix are taken as vectors representing the documents, and the comparison is via the dot product between the rows of the DS matrix.

Vector Representations of Pseudo-Objects

The previous results show how it is possible to compute comparisons between the various objects associated with the rows or columns of Y. It is very important in essay scoring applications to compute similar comparison quantities for objects such as essays that do not appear explicitly in Y. For example, it is necessary to be able to take an essay, find a location in the k-dimensional latent semantic space for it, and then evaluate its cosine with respect to reference texts in the space. The new object for this example is equivalent to objects in the matrix Y in that they may be represented as vectors of terms. For this reason they are called pseudo-documents specifically or pseudo-objects generically. The pseudo-object vector representation is the average of the vector elements the text contains.

The following is a discussion to compute a pseudo-object vector representation using the two of the three individual matrices obtained from the SVD. In order to compare pseudo-objects to other documents, the starting point is defining a pseudo-document vector, designated $Y_q$. Then a representation $D_q$ is derived such that $D_q$ can be used just like a row of D in the comparison relationships described in the foregoing sections. One criterion for such a derivation is that the insertion of a real document $Y_i$ should give $D_i$ when the model is ideal (i.e., $Y=Y_R$). With this constraint, $Y_q = TSD_q^T$ or, since $T^T T$ equals the identity matrix, $$D_q^T = S^{-1} T^T Y_q$$

or, finally, $$D_q = Y_q^T T S^{-1}. \quad (4)$$

Thus, with appropriate rescaling of the axes, this amounts to placing the pseudo-object at the vector sum of its corresponding term points. The Dq may be used like any row of D and, appropriately scaled by S or $S^{1/2}$, can be used like a usual document vector for making comparisons. It is to be noted that if the measure of similarity to be used in comparing the documents is one in which only a measurement of the angle between the vectors is important (such as the cosine), there is no difference for comparison purposes between placing a text segment at the vector average or the vector sum of its terms since the average and sum differ only in magnitude.

Semantic Analysis and Evaluation of the Content of Writing

Figure 2:
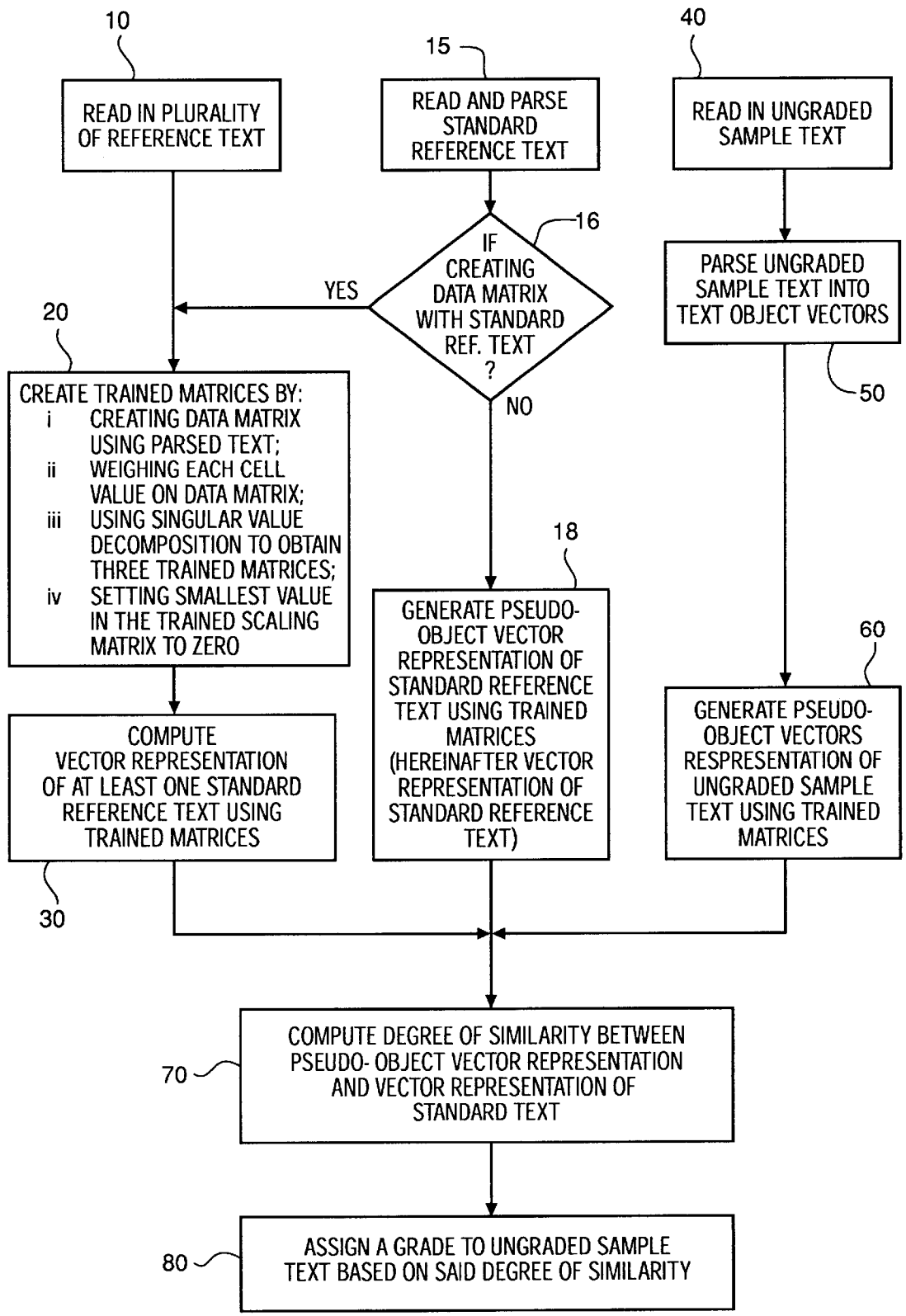
FIG. 2 is a flow diagram describing the method of the present invention operable to automate and evaluate text analysis.

To extend the principles of LSI to automate and evaluate text, FIG. 2 shows one embodiment of the present invention to automate and evaluate text analysis. In this embodiment, the student's essay, the ungraded sample text, is compared to a standard reference text or otherwise known as the standard text. The standard text might be the same subject-matter text the students read to acquire the knowledge, several texts representative of the subject-matter domain, or one or more model answers to the essay question written by the professor.

Element 10 reads and stores a plurality of reference texts. Reference texts are used create a data matrix that define the domain of knowledge. A standard reference text is used as a basis of comparison for the ungraded sample text.

Element 15 reads, stores and parses the standard reference text, or as equivalently known as the standard text. The data matrix, however, does not have to be created with the standard reference text. If the standard reference text is used to create the data matrix, element 16 requests the parsed information from the standard reference text for use to create the data matrix.

Reference text can be, for example, articles on the subject-matter, or a set of authoritative text that students used to learn the subject-matter. A reference text includes any text which assists to define the range of the domain of knowledge.

A person skilled in the art will appreciate text can be in machine-readable form before being retrieved. Otherwise the text can be converted to machine-readable text, for example, by scanning the text, manually typing the text into a database, or reciting the text into a speech-to-text translator.

A person skilled in the art will appreciate this information can be stored, for example, in cache, nonvolatile memory, hard-disk space, CD-ROM, floppy disk, or tape.

Element 20 creates trained matrices. First, a data matrix is created by including unique terms used in two or more reference documents. The reference text is parsed into text objects and segments. The data matrix is a text object (row) by segment (column) matrix (i,j). A text object is an unique word, concept, or phrase. Each cell entry represents the number of times that a text object (i) appears in a text segment (j) when the text object appears in two or more texts.

The segment vector represents the individual reference documents. A segment vector can be, but is not limited to, an entire reference text, abstract, title of a document, at least one paragraph of a text, at least one sentence of a text, or a collection of text objects that convey an idea or summarizes a topic. Each document is allocated a single vector within the data matrix.

Within the data matrix, a weighted value is applied to each cell. The resulting weighted cells are a proportional representation of the importance of the cell's original information, for example, rare words are weighed more heavily.

Singular Value Decomposition (SVD) is applied to the data matrix to decompose the data matrix into three trained matrices. As previously discussed, the first trained matrix consists of the original row (text object) identities, and columns of orthogonal derived factor values. The second trained matrix consists of the original column (segment) identities, and rows of orthogonal derived factor values. The third trained matrix consists of a diagonal matrix containing scaling values.

The number of dimensions in these trained matrices are further reduced by setting the smallest values in the scaling matrix to zero. The reduced dimensions describe major associational structures in the data matrix, but ignore small variations in the word usage. The optimal dimensionality for the final solution is determined empirically for each application depending upon the desired results. Typically more than 100 dimensions are used.

Applying matrix multiplication to these three matrices creates the semantic-space matrix, $Y_r = TSD^T$. As previously discussed, the semantic-space matrix or alternatively the three trained matrices can be used to compare ungraded documents to a standard reference document.

Element 30 computes the vector representation of at least one standard reference text used to create the data matrix. The vector representation of the standard reference text is the average of the text object vectors using each element of the text objects within the standard reference text. This is computed as the average of the sum of each element of the text object vectors in the corresponding document row in the matrix DS. Alternatively, the vector representation of the standard reference text can be computed using the sum of the text object vectors using each element of the text objects within the standard reference text.

The student's essay, otherwise known as the ungraded sample text, is read and stored by element 40. Element 50 parses the ungraded sample text into text objects. These text objects are the same text objects used to parse the plurality of reference text.

Element 60 generates a pseudo-object vector representation for the ungraded sample text. The pseudo-object vector representation is the average of the vector elements the ungraded sample text contains. Alternatively, the pseudo-object vector representation can be computed using the sum of the text object vectors using each element of the text objects within the standard reference text.

This pseudo-object can be computed using either of the following two methods. Both methods are mathematically equivalent. In a first method, each vector element is determined by locating each parsed text object within the semantic-space matrix. Each cell value for the text object, that is vector element, is summed over the entire row in the semantic-space matrix. This is repeated for each text object found within the ungraded sample text. The vector representation is the average, or alternatively the sum, of the vector elements the ungraded sample text contains.

In another method, the three trained matrices are used to compute the pseudo-object for the ungraded sample text. In this case, first define a pseudo-document vector using the parsed text objects as vector elements. Matrix multiply the transposed pseudo-document vector to the first trained matrix and to the inverse of the third trained matrix, that is, equation 4. Next, sum or average each element of the segment vector. This pseudo-document vector can be used as a segment row representing any document within the second trained matrix. A person skilled in the art will note, both methods to compute the pseudo-object are mathematically equivalent.

Element 18 computes the pseudo-object for the standard reference text if the standard reference text was not used to create the data matrix. The vector representation of the standard reference text can be computed using the trained matrices, or equivalently using the equations for the pseudo-object vector representations. The computation for the pseudo-object of the standard reference text is similar to the computation for the pseudo-object for the ungraded sample text previously discussed. The pseudo-object vector representation of the standard text is hereinafter referred to as the vector representation of the standard text.

Element 70 determines the degree of similarity between the ungraded sample text and the standard reference text by comparing the pseudo-object vector representation of the ungraded sample text to the vector representation of the standard text. A person skilled in the art will note there are alternative methods to compare the similarity between two documents. In the preferred embodiments, a cosine between the pseudo-object vector representation and the vector representation of the standard reference text vector is computed. An alternative method to compute the similarity between both documents comprises computing a dot product between the pseudo-object vector representation and the vector representation of the standard reference text.

Element 80 assigns a grade based on the cosine value. Alternatively, element 80 assigns a grade based on the dot product value, if the dot product was used to compute the similarity between the ungraded sample text and the standard reference text. This grade reflects how close the student essay is to the ideal answer. A high cosine value indicates both documents are very similar. A low cosine value indicates the ungraded sample text does not discuss the same information as included in the standard reference text.

Figure 3A:
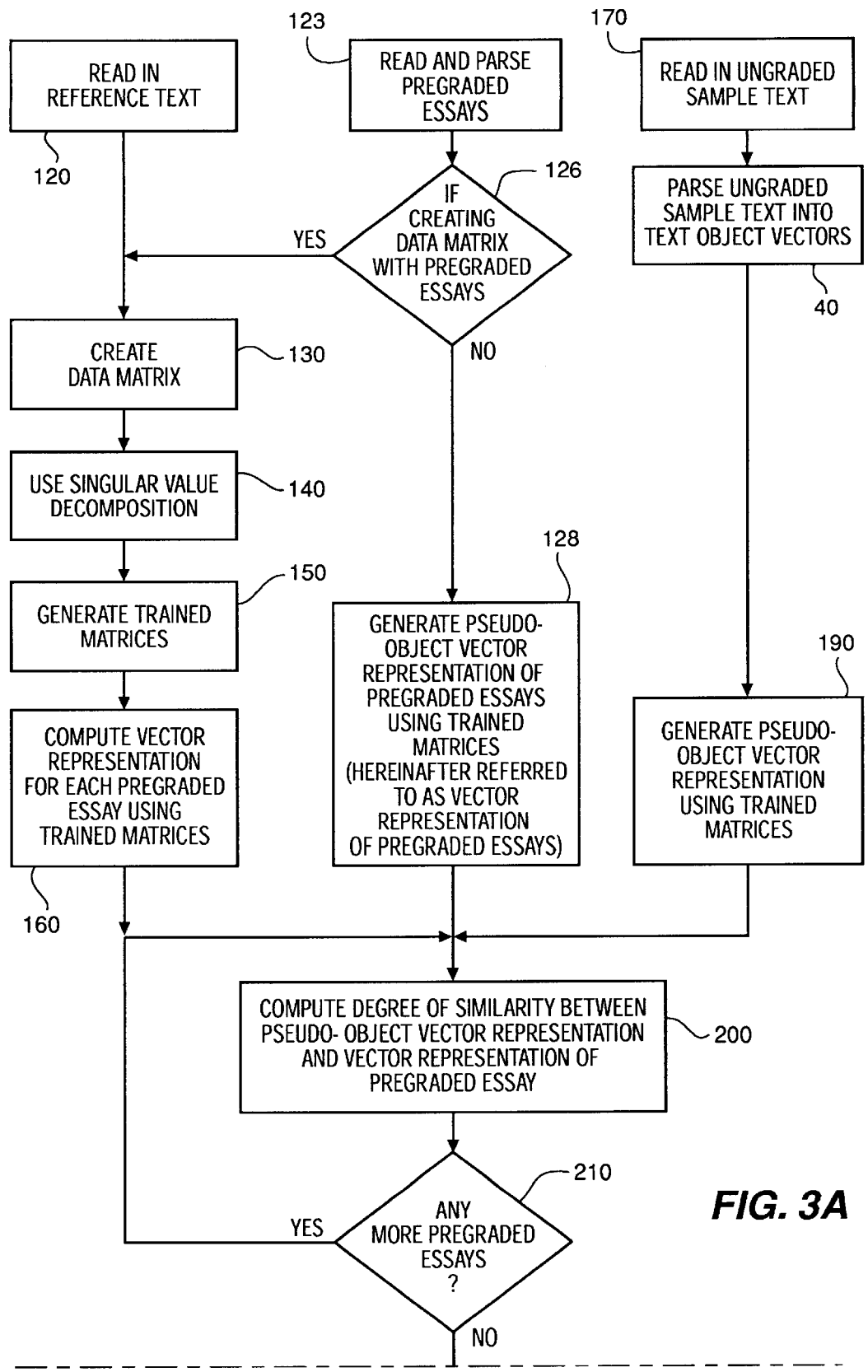
FIGS. 3A and 3B is a flow diagram describing a second embodiment of the present invention operable to automate and evaluate text analysis.
Figure 3B:
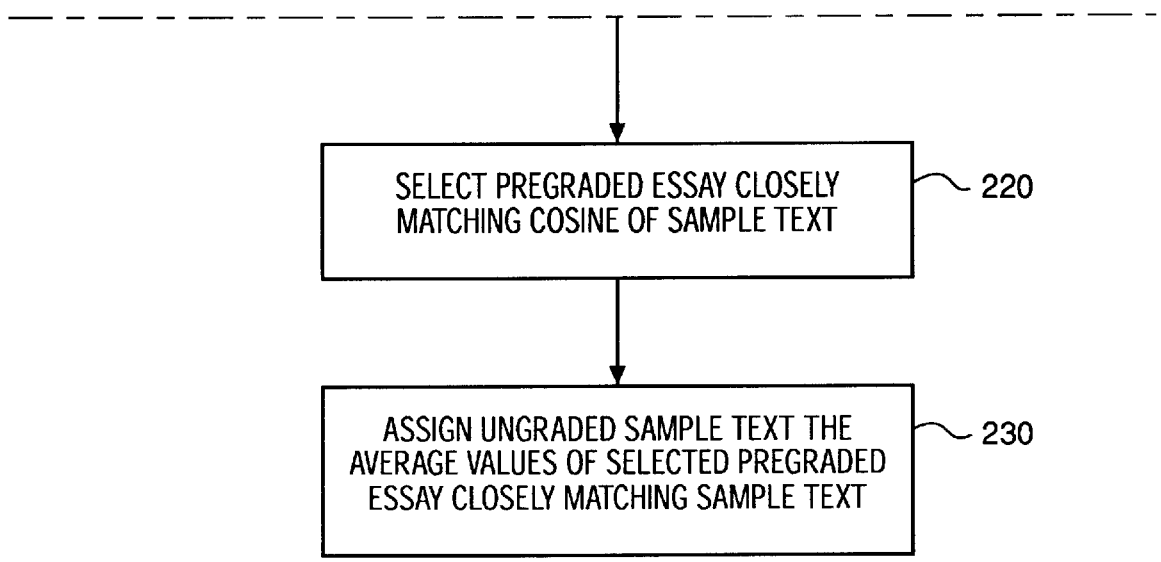

FIG. 3A and FIG. 3B represent a second embodiment of the present invention. In this embodiment, the ungraded sample text is compared to at least one pregraded sample text, that is, the standard reference text in this embodiment is the pregraded sample text. The pregraded sample text is a subset of student essays that were previously evaluated by an expert grader.

Element 120 reads and stores the plurality of reference text. Element 125 reads, stores, and parses the pregraded sample text. The pregraded sample text may be used to create the data matrix. If the pregraded sample text is used to create the data matrix, element 126 requests the parsed information from the pregraded sample text for use to create the data matrix.

In the same manner as discussed previously, element 130 creates a weighted data matrix using the plurality of reference text. Element 140 uses SVD to decompose the data matrix into three matrices and reduce the dimension of the three matrices. Element 150 is the resulting three trained matrices.

Element 160 computes the vector representation of each pregraded sample text using the trained matrices. Element 128 computes the pseudo-object vector representation of the pregraded sample text if the pregraded sample text was not used to create the data matrix. As previously discussed, the pseudo-object vector representation of the pregraded sample text is hereinafter referred to as the vector representation of the pregraded sample text.

Element 170 reads and stores the ungraded sample text. Element 180 parses the ungraded sample text into text-object vectors and element 190 generates the pseudo-object vector representation of the ungraded sample text.

Element 200 computes the degree of similarity between the pseudo-object vector representation of the ungraded sample text and the vector representation of the pregraded essay. The degree of similarity is the cosine between the pseudo-object vector representation of the ungraded sample text and the vector representation of the pregraded essay. A person skilled in the art will note an alternative method to compute the similarity between both documents comprises computing a dot product between the pseudo-object vector representation and the vector representation of the standard reference text.

Element 210 ensures each of the ungraded sample text is compared to each of the pregraded sample text. The flowchart of FIGS. 3A and 3B then continues at label "A" on FIG. 3B. Element 220 selects a subset of pregraded sample text most similar to the ungraded sample text. Element 230 assigns the ungraded sample text the weighted average of the cosine values for the subset of pregraded sample text. Alternatively, element 230 assigns the ungraded sample text the weighted average of the dot product values for the selected pregraded sample text, if the dot product was used to compute the similarity between the ungraded sample text and the pregraded sample text. Another alternative method comprises element 230 assigning the ungraded sample text the simple average of the cosine or dot product values of the subset of the pregraded sample text.

Figure 4A:
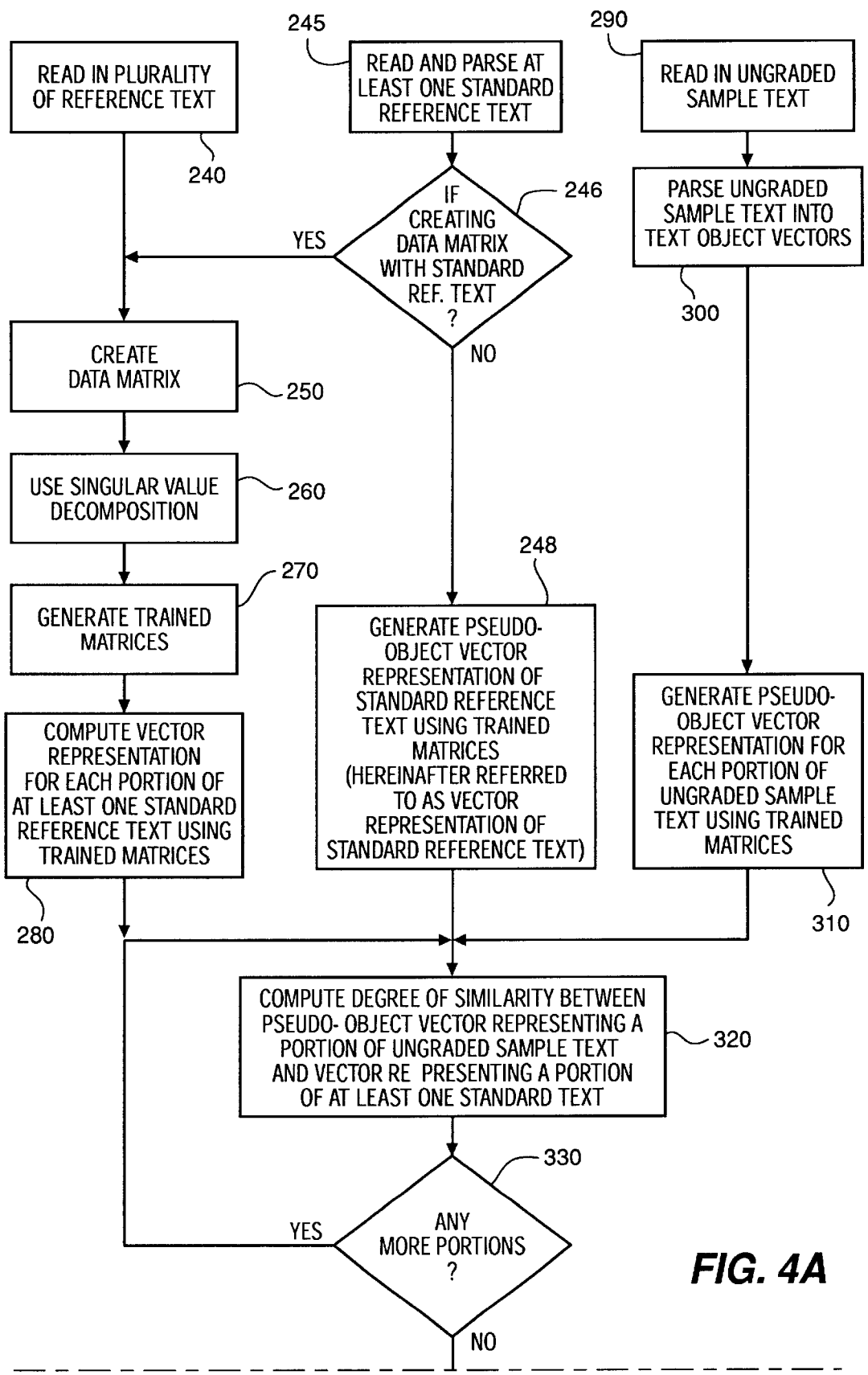
FIGS. 4A and 4B is a flow diagram describing a third embodiment of the present invention operable to automate and evaluate text analysis.
Figure 4B:
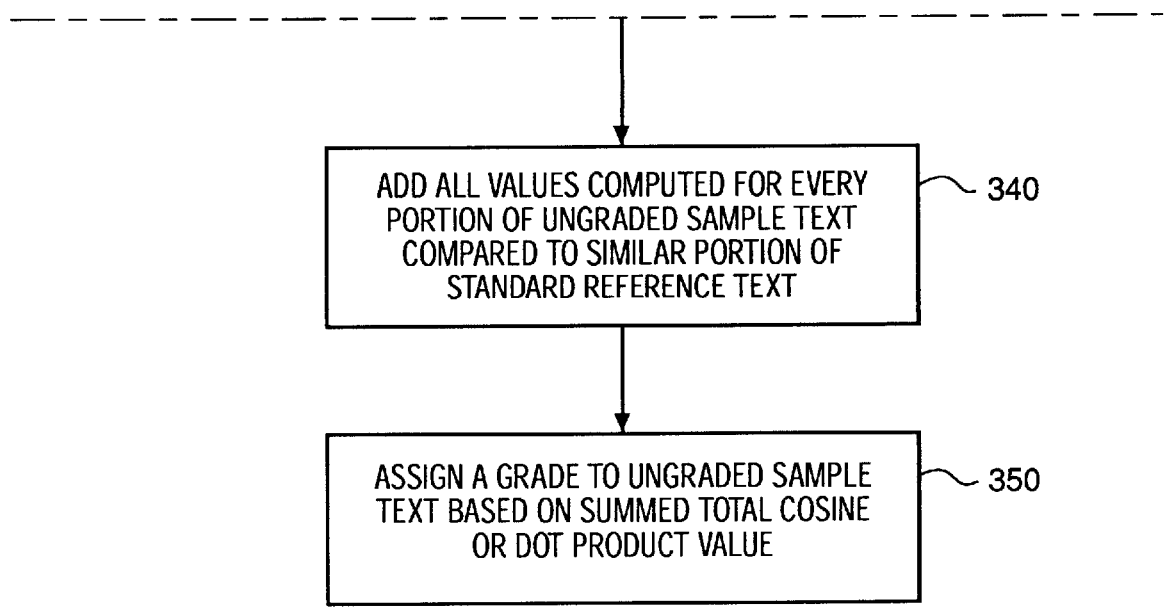

FIG. 4A and FIG. 4B represent a third embodiment of the present invention. This embodiment is similar to the first embodiment, but instead of comparing the overall ungraded sample text to the overall standard reference text, this method compares the sub-components, such as sentences, in the ungraded sample text to similar sized sub-components of the standard reference text. Thus, if the standard reference text is a section of a textbook, then each sentence of that section of the textbook is compared to each sentence of the ungraded sample text. The similarity between the sentences in the ungraded sample text and the sentences in the standard reference is computed. The computed values are summed and a grade is assigned to the ungraded sample text based on the final total value. This method provides diagnostic information about the subject-matter present or lacking in the ungraded sample text.

The steps required to create the semantic-space matrix are similar to previous embodiments. Element 240 reads and stores the plurality of reference text. Element 245 reads, stores, and parses at least one standard reference text. In this embodiment, however, the standard reference text is parsed into predefined portions.

The data matrix does not have to be created with the standard reference text. If the standard reference text is used to create the data matrix, element 246 requests the parsed information from the standard reference text for use to create the data matrix.

Element 250 creates a data matrix from the parsed plurality of reference text and applies a weighted value to each cell of the data matrix. Element 260 uses SVD to decompose the data matrix into three matrices. The dimension of these matrices are reduced by setting the smallest values of the diagonal matrix to zero. Element 270 is the resulting trained matrices.

Element 290 reads and stores the ungraded sample text. Element 300 parses the ungraded sample text into text object vectors.

Element 280 computes the vector representation for each portion of the standard reference text. Element 248 generates a pseudo-object vector representation of the standard reference text if the standard reference text was not used to create the data matrix. This pseudo-object vector representation of the standard text is hereinafter referred to as the vector representation of the standard reference text.

Element 310 computes the pseudo-object vector representation for a similarly sized portion of the ungraded sample text.

Next, element 320 computes the degree of similarity between each portion of the ungraded sample text and each similarly computed portion of the standard reference text. Element 320 computes the cosine between the pseudo-object vector representation for a portion of the ungraded sample text and the vector representation for a similarly sized portion of standard reference text. A person skilled in the art will note an alternative method to compute the degree of similarity between both documents comprises computing a dot product between the pseudo-object vector representation and the vector representation of a similarly sized standard reference text.

Element 330 repeats this computation for each portion of the ungraded sample text and each portion of the standard reference text. The flowchart of FIG. 4A then continues at label "B" on FIG. 4B. Element 340 sums all cosine values computed. Element 350 assigns a grade to the ungraded sample text based on the final summed cosine value. Alternatively, element 350 assigns a grade to the ungraded sample text based on the final summed dot product values.

Figure 5:
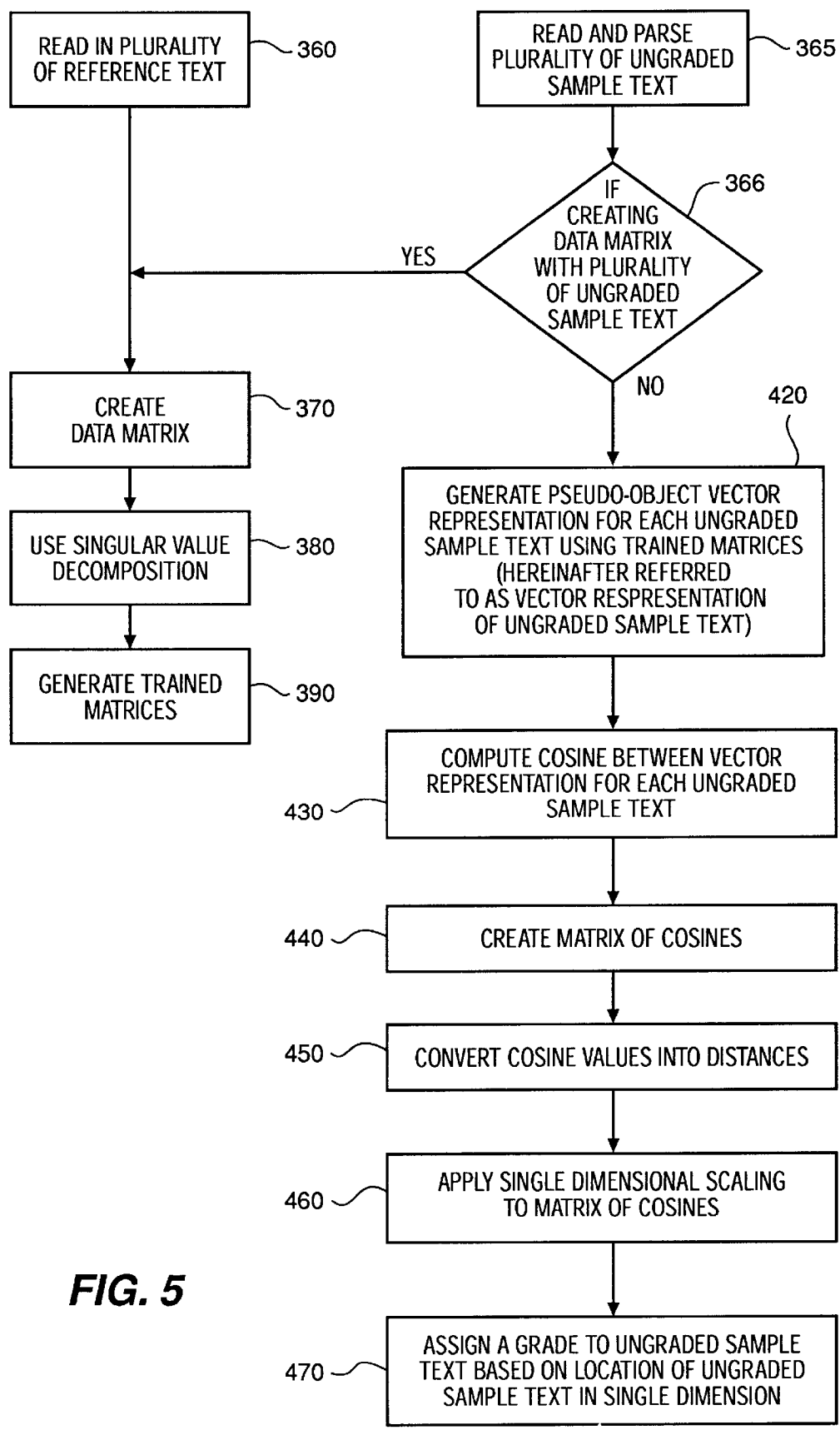
FIG. 5 is a flow diagram describing a fourth embodiment of the present invention operable to automate and evaluate text analysis.

FIG. 5 represents a fourth embodiment of the present invention. In the previous embodiments, the scoring scale was derived from previously graded essays, or at least one standard reference text. In this embodiment, the scoring scale is derived from the students ungraded essays and the resulting grade is based on how the ungraded essay ranks among other ungraded essays.

Element 360 reads and stores a plurality of reference text. Element 365 reads, stores, and parses a plurality of ungraded sample text. The data matrix, however, does not have to be created with the plurality of ungraded sample text. If the plurality of ungraded sample text is used to create the data matrix, element 366 requests the parsed information from the plurality of ungraded sample text for use to create the data matrix.

Element 370 creates a data matrix and applies a weighted value to each cell within the data matrix. Element 380 applies singular value decomposition to decompose the data matrix into three matrices. The dimension of these matrices are reduced by setting the smallest diagonal values to zero. Element 390 is the trained matrices.

Element 420 generates a pseudo-object vector representation for each ungraded sample text.

Next the degree of similarity is computed. Element 430 computes the cosine between the pseudo-object vector representation for an ungraded sample text and all other pseudo-object vector representation of ungraded sample text. A person skilled in the art will note an alternative method to determine the degree of similarity between two documents is computing the dot product between the pseudo-object vector representation for an ungraded sample text and all other pseudo-object vector representation of ungraded sample text.

Element 440 stores the cosine values in a two-dimensional matrix of cosines. Where the plurality of ungraded sample text is the first dimension and second dimensions of the cosine matrix. If the dot product was computed earlier, then this matrix contains the dot product values.

Element 450 converts the cosine values into distances as 1-cosine. Element 460 applies single dimensional scaling to the matrix of cosines known as unfolding. Unfolding is well known is the art and is discussed in A Theory of Data, by C. H. Coombs, New York, Wiley (1964). Element 470 assigns a grade to the ungraded sample text based on the location of the ungraded sample text in the single dimension.

Figure 6:
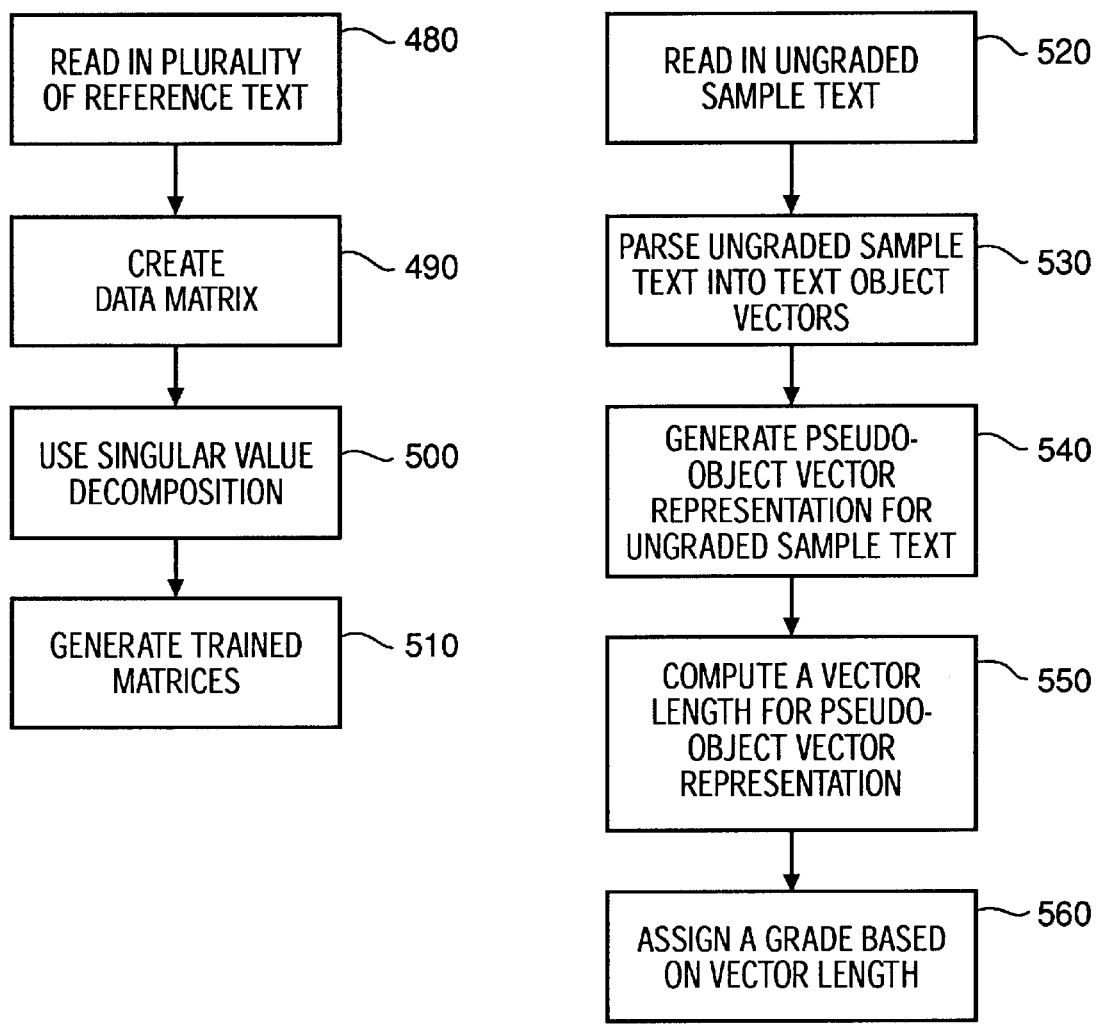
FIG. 6 is a flow diagram describing a fifth embodiment of the present invention operable to evaluate the amount of relevant subject matter in the text.

FIG. 6 represents a fifth embodiment of the present invention. This embodiment can be performed alone or in combination with the other embodiments. In this embodiment, the amount of relevant subject-matter in the ungraded sample text is measured. In this embodiment, the vector length of the pseudo-object vector representation is computed. The vector length measures of the amount of text object vectors in the pseudo-object vector representation, which is a measurement of the number of important ideas represented in the ungraded essay.

The process in this embodiment used to create the trained matrices is similar to previous embodiments. Element 480 reads and stores a plurality of reference text. Element 490 creates the data matrix and applies a weighted value to each cell within the data matrix. Element 500 applies SVD to the data matrix and sets the smallest values in the diagonal matrix to zero. Element 510 is the resulting trained matrices.

The process used to create the pseudo-object vector representation is similar to previous embodiments. Element 520 reads and stores ungraded sample text. Element 530 parses the ungraded sample text into text object vectors. Element 540 generates the pseudo-object vector representation for the ungraded sample text.

Element 550 computes a vector length for the pseudo-object vector representation by computing the square root of the sum of each squared text object element in the pseudo-object vector representation. Element 560 assigns a grade based on the computed vector length.

Figure 7:
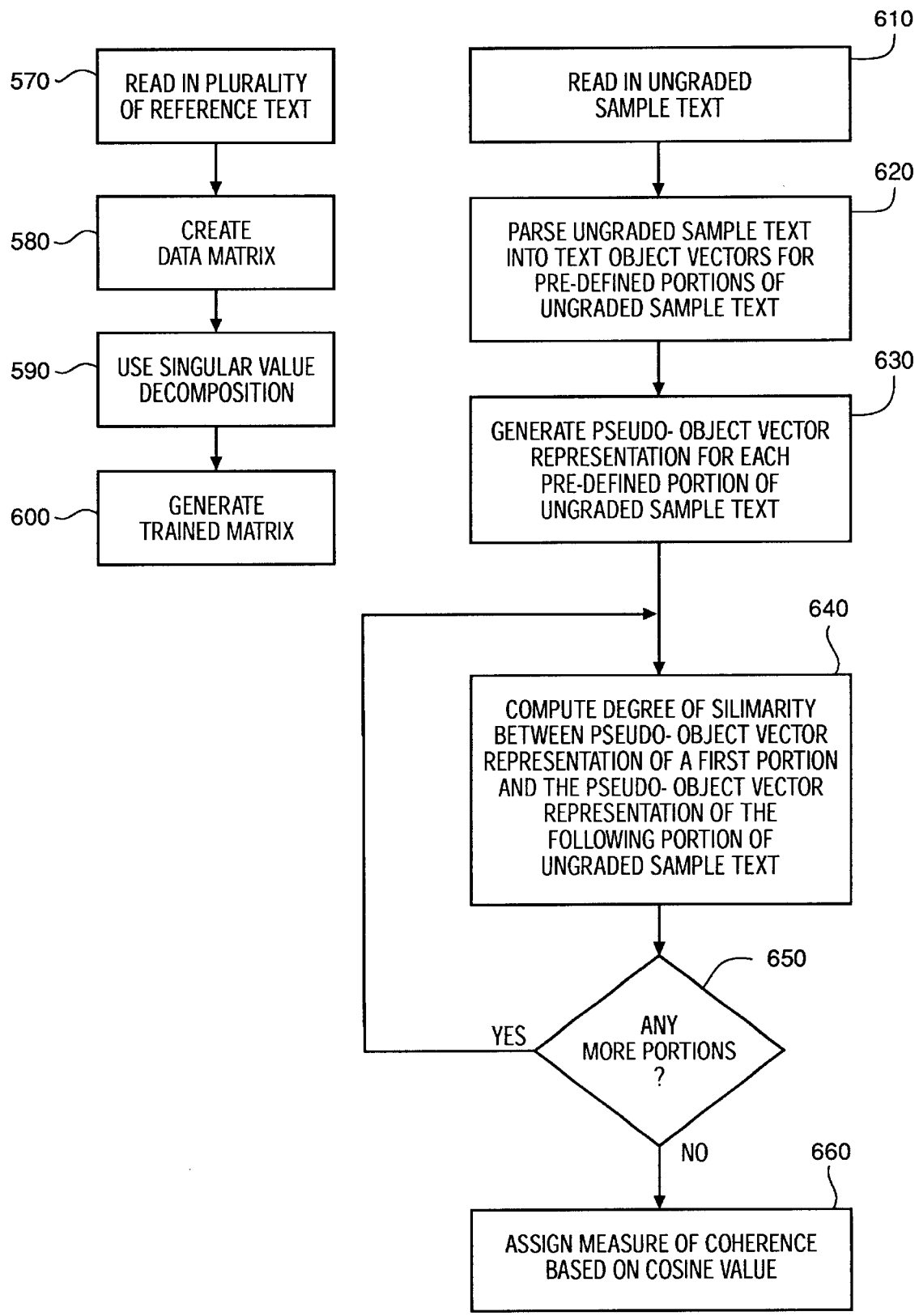
FIG. 7 is a flow diagram describing a method to evaluate the coherence of a text.

FIG. 7 represents a sixth embodiment of the present invention. This embodiment measures the coherence of the ungraded student essay. In this embodiment, a vector is constructed for each sentence in the student's essay, then compared to the vector for the following sentence within the same paragraph or the next paragraph. Similarly, a vector for a sentence can be compared the vector for the next whole paragraph or a vector for the whole essay.

This process employs the same steps used in the previous embodiments to create the trained matrices. Element 570 reads and stores a plurality of reference text. Element 580 creates a data matrix using the plurality of reference text and applies a weighted value to each cell within the data matrix. Element 590 applies SVD to the data matrix and sets the smallest values in the diagonal matrix to zero. Element 600 is the resulting trained matrices.

This embodiment uses the same process as used in the third embodiment to generate a pseudo-object vector representation. Element 610 reads and stores ungraded sample text. Element 620 parses the ungraded sample text into text object vectors for predefined portions of ungraded sample text. Element 630 generates pseudo-object vector representations for each predefined portion of ungraded sample text.

Element 640 computes the degree of similarity between a pseudo-object vector representation of a first portion and the pseudo-object vector representation of the following portion of ungraded sample text. The degree of similarity is computed as the cosine between the pseudo-object vector representation of a first portion and the pseudo-object representation of the following portion of ungraded sample text. A person skilled in the art will note an alternative method to compute the similarity between both documents comprises computing a dot product between the pseudo-object vector representation of a first portion and the pseudo-object vector representation of the following portion of ungraded sample text. Element 650 repeats this step for all predefined portions. Element 660 assigns a coherence grade based on the cosine values computed. Alternatively, a grade can be assigned based on the dot product values computed.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method operable in a computing device for grading an ungraded sample text relative to at least one standard text comprising the steps of:
    generating trained matrices with said at least one standard text; and
    determining a degree of similarity between said ungraded sample text and said at least one standard text using said trained matrices;
    determining a vector length corresponding to said ungraded sample text; and
    assigning a grade to said ungraded sample text based on said vector length.

2. The method of claim 1 wherein the step of determining a vector length further comprises the steps of:
    generating a pseudo-object vector representation for said ungraded sample text; and
    computing a vector length of said pseudo-object vector representation.

3. The method of claim 1 wherein said at least one standard text comprises at least one pregraded essay and wherein the method further comprises the steps of:
    determining a subset of said at least one pregraded essay that is most similar to said ungraded sample text;
    computing an average of said subset; and
    assigning said average as a grade for said ungraded sample text.

4. The method of claim 1
    wherein said at least one standard text is parsed into predefined portions and said ungraded sample text is parsed into predefined portions, and
    wherein the step of determining a degree of similarity between said ungraded sample text and said at least one standard text further comprises the step of determining the degree of similarity between said predefined portion of said at least one standard text and said predefined portion of said ungraded sample text, and
    wherein the method further comprises the step of:
    assigning a grade to said ungraded sample text based on said degree of similarity between said predefined portion of said ungraded sample text and said predefined portion of said at least one standard text.

5. The method of claim 1
    wherein said at least one standard text comprises a plurality of additional ungraded sample texts, and
    wherein the step of determining a degree of similarity between said ungraded sample text and said at least one standard text comprises the step of:
    determining a relative ranking of said plurality of additional ungraded sample texts and said ungraded sample text.

6. The method of claim 1 further comprising the step of:
    parsing said plurality of reference texts into a first set of text object vectors and a first set of segment vectors.

7. The method of claim 6 wherein said step of generating trained matrices with said plurality of reference texts comprises the steps of:
    generating a data matrix using said first set of text object vectors and said first set of segment vectors;
    using singular value decomposition to decompose said data matrix to create said trained matrices; and
    reducing the dimensions in said trained matrices.

8. The method of claim 7 wherein said step of generating a data matrix comprises the steps of:
    creating a data matrix using said first set of text object vectors as a first dimension and said first set of segment vectors as a second dimension; and
    applying a weighted value to each cell in said data matrix.

9. The method of claim 8 wherein step of creating a data matrix further comprises the steps of:
    parsing said at least one standard text into a second set of text object vectors and a second set of segment vectors; and
    including in said data matrix said second set of text object vectors in said first dimension and said second set of segment vectors in said second dimension.

10. The method of claim 1 wherein said step of determining a degree of similarity comprises the steps of:
    generating a pseudo-object vector representation of said ungraded sample text;
    computing a vector representation for said at least one standard text;
    comparing said pseudo-object vector representation and said vector representation; and
    assigning a grade to said ungraded sample text based on said comparison.

11. The method of claim 10 wherein said step of generating a pseudo-object vector representation comprises the steps of:
    parsing said ungraded sample text into a first set of text object vectors; and computing the average of said first set of text object vectors by averaging the sum of each text object vector element of each of said first set of text object vectors in accordance with said trained matrices.

12. The method of claim 10 wherein said step of computing a vector representation comprises the steps of:

parsing said at least one standard text into a first set of text object vectors; and computing the average of said first set of text object vectors by averaging the sum of each text object vector element of each of said first set of text object vectors in accordance with said trained matrices.

13. The method of claim 10 wherein the method step of generating a pseudo-object vector representation comprises the steps of:

parsing said ungraded sample text into a first set of text object vectors: and computing the sum of said first set of text object vectors by summing each text object vector element of each of said first set of text object vectors in accordance with said trained matrices.

14. The method of claim 10 wherein the step of comparing said pseudo-object vector representation and said vector representation further comprises the step of:

computing a cosine between said pseudo-object vector representation and said vector representation.

15. The method of claim 10 wherein the step of comparing said pseudo-object vector representation and said vector representation further comprises the step of:

computing a dot product between said pseudo-object vector representation and said vector representation.

16. The method operable in a computing system for determining similarity of an ungraded sample text relative to at least one pregraded sample text comprising the steps of:

generating trained matrices with a plurality of reference texts;

determining a vector length corresponding to said ungraded sample text; and determining a degree of similarity between said ungraded sample text and said at least one pregraded sample text using said trained matrices and using said vector length.

17. The method of claim 16 wherein said step of generating trained matrices comprises the steps of:

parsing said plurality of reference texts into a first set of text object vectors and a first set of segment vectors;

creating a data matrix using said first set of text object vectors as a first dimension and using said first set of segment vectors as a second dimension;

applying a weighted value to each cell within said data matrix;

using singular value decomposition to decompose said data matrix to create trained matrices; and reducing the dimensions in said trained matrices.

18. The method of claim 17 wherein said step of creating a data matrix further comprises the steps of:

parsing said at least one pregraded sample text into a second set of text object vectors and a second set of segment vectors; and including in said data matrix said second set of text object vectors in said first dimension and said second set of segment vectors in said second dimension.

19. The method of claim 16 wherein said step of determining a degree of similarity comprises the steps of:

generating a pseudo-object vector representation of said ungraded sample text;

computing a vector representation for said at least one pregraded sample text;

computing a cosine between said pseudo-object vector representation and said vector representation;

determining a subset of said at least one pregraded sample text that is most closely matching said ungraded sample text;

computing the weighted average of said subset; and assigning said weighted average as a grade for said ungraded sample text.

20. The method of claim 16 wherein said step of determining a degree of similarity comprises the steps of:

generating a pseudo-object vector representation of said ungraded sample text;

computing a vector representation for said at least one pregraded sample text;

computing a dot product value between said pseudo-object vector representation and said vector representation;

determining a subset of said at least one pregraded sample text that is most closely matching said ungraded sample text;

computing the weighted average of said subset; and assigning said weighted average as a grade for said ungraded sample text.

21. A method operable in a computing system for determining similarity of a portion of ungraded sample text relative to a portion of at least one standard text, comprising the steps of:

generating trained matrices with a plurality of reference texts;

determining a vector length corresponding to said portion of said ungraded sample text; and determining a degree of similarity between said portion of ungraded sample text and said portion of at least one standard text using said trained matrices.

22. The method of claim 21 wherein said step of generating trained matrices comprises the steps of:

parsing said plurality of reference texts into a first set of text objects vectors and a first set of segment vectors;

creating a data matrix using said first set of text object vectors as a first dimension and said first set of segment vectors as a second dimension;

applying a weighted value to each cell within said data matrix;

using singular value decomposition to decompose said data matrix to create trained matrices; and reducing the dimensions in said trained matrices.

23. The method of claim 22 wherein said step of creating a data matrix further comprises:

parsing said portion of said at least one standard text into a second set of text object vectors and a second set of segment vectors; and including in said data matrix said second set of text object vectors in said first dimension and said second set of segment vectors in said second dimension.

24. The method of cdaim 21 wherein the step of determining a degree of similarity between said portion of ungraded sample text and said portion of said at least one standard text comprises the steps of:

generating a pseudo-object vector representation for said portion of said ungraded sample text;

computing a vector representation for said portion of said at least one standard text;

computing a cosine value between said pseudo-object vector representation and said vector representation;

adding said cosine computed between each said portion of ungraded sample text and each said portion of said at least one reference text; and assigning a grade based on said addition of said cosine values.

25. The method of claim 21 wherein the step of determining a degree of similarity between said portion of ungraded sample text and said portion of said at least one standard text further comprises the steps of:

generating a pseudo-object vector representation for said portion of said ungraded sample text;

computing a vector representation for said portion of said at least one standard text;

computing a dot product value between said pseudo-object vector representation and said vector representation;

adding said dot product value computed between each said portion of ungraded sample text and each said portion of said at least one reference text; and assigning a grade based on said addition of said dot product values.

26. A method operable in a computing system for relative ranking of a plurality of sample texts, comprising the steps of:

generating trained matrices with a plurality of reference texts;

determining a vector length corresponding to each of said plurality of sample texts; and determining a degree of similarity between said plurality of sample texts using said trained matrices and using said vector length.

27. The method of claim 26 wherein said step of generating trained matrices comprises the steps of:

parsing said plurality of reference texts into a first set of text object vectors and a first set of segment vectors;

creating a data matrix using said first set of text object vectors as a first dimension and said first set of segment vectors as a second dimension;

applying a weighted value to each cell within said data matrix;

using singular value decomposition to decompose said data matrix to create trained matrices; and reducing the dimensions in said trained matrices.

28. The method of claim 27 wherein said step of creating a data matrix further comprises:

parsing each of said plurality of sample texts into a second set of text object vectors and a second set of segment vectors; and including in said data matrix said second set of text object vectors in said first dimension and said second set of segment vectors in said second dimension.

29. The method of claim 26 wherein said step of determining a degree of similarity between said plurality of sample texts comprises the steps of:

generating a vector representation for each said sample text in said plurality of sample texts;

computing a plurality of cosine values between each said vector representation for each said sample text in said plurality of sample texts;

creating a matrix of said plurality of cosine values wherein indicia of each said sample text of said plurality of sample texts is a first dimension of said matrix of said plurality of cosines values and indicia of each said sample text of said plurality of sample texts is a second dimension of said matrix of said plurality of cosine values;

converting said cosine values within said matrix of said plurality of cosine values into distances; and assigning a ranking to each said sample text of said plurality of sample texts based on relative values derived from single dimensional scaling of said distances.

30. The method of claim 26 wherein said step of determining a degree of similarity between said plurality of sample texts comprises the steps of:

generating a vector representation for each said sample text in said plurality of sample texts;

computing a plurality of dot product values between each said vector representation for each said sample text in said plurality of sample texts;

creating a matrix of said plurality of dot product values wherein indicia of each said sample text of said plurality of sample texts is a first dimension of said matrix of said plurality of dot product values and indicia of each said sample text of said plurality of sample texts is a second dimension of said matrix of said plurality of dot product values;

converting said dot product values within said matrix of said plurality of dot product values into distances; and assigning a ranking to each said sample text of said plurality of sample texts based on relative values derived from single dimensional scaling of said distances.

31. A method operable in a computing system for analysis and evaluation of the amount of relevant knowledge an ungraded sample text contains comprising the steps of:

generating trained matrices with a plurality of reference texts;

computing a vector length corresponding to said ungraded sample text; and assigning a grade representing the amount of relevant knowledge to said ungraded sample text based on the vector length of said ungraded sample text using said trained matrices.

32. The method of claim 31 wherein the step of generating trained matrices with a plurality of reference texts comprises the steps of:

parsing said plurality of reference texts into a first set of text object vectors and a first set of segment vectors;

creating a data matrix using said first set of text object vectors as a first dimension and said first set of segment vectors as a second dimension;

applying a weighted value to each cell in said data matrix;

using singular value decomposition to decompose said data matrix to create trained matrices; and reducing the dimensions of said trained matrices.

33. The method of claim 31 wherein said step of assigning a grade based on the amount of relevant knowledge contained in said ungraded sample text comprises the steps of:

generating a pseudo-object vector representation for said ungraded sample text; and computing a vector length of said pseudo-object representation.

34. A computer readable storage medium tangibly embodying programmed instructions for performing a method for grading an ungraded sample text relative to at least one standard text, the method comprising the steps of:

generating trained matrices with said at least one standard text;

determining a degree of similarity between said ungraded sample text and said at least one standard text using said trained matrices;

determining a vector length corresponding to said ungraded sample text; and assigning a grade to said ungraded sample text based on said vector length.

35. The storage medium of claim 34 wherein the method step of determining a vector length further comprises the steps of:

generating a pseudo-object vector representation for said ungraded sample text; and computing a vector length of said pseudo-object vector representacion.

36. The storage medium of claim 34 wherein said at least one standard text comprises at least one pregraded essay and wherein the method further comprises the steps of:

determining a subset of said at least one pregraded essay that is most similar to said ungraded sample text;

computing a weighted average of said subset; and assigning said weighted average as a grade for said ungraded sample text.

37. The storage medium of claim 34 wherein said at least one standard text is parsed into predefined portions and said ungraded sample text is parsed into predefined portions, and wherein the step of determining a degree of similarity between said ungraded sample text and said at least one standard text further comprises the step of determining the degree of similarity between said predefined portion of said at least one standard text and said predefined portion of said ungraded sample text, and wherein the method further comprises the step of:

assigning a grade to said ungraded sample text based on said degree of similarity between said predefined portion of said ungraded sample text and said predefined portion of said at least one standard text.

38. The storage medium of claim 34 wherein said at least one standard text comprises a plurality of additional ungraded sample texts, and wherein the step of determining a degree of similarity between said ungraded sample text and said at least one standard text comprises the step of:

determining a relative ranking of said plurality of additional ungraded sample texts and said ungraded sample text.

39. The storage medium of claim 34 wherein the method further comprises the step of:

parsing said plurality of reference texts into a first set of text object vectors and a first set of segment vectors.

40. The storage medium of claim 39 wherein the method step of generating trained matrices with said plurality of reference texts comprises the steps of:

generating a data matrix using said first set of text object vectors and said first set of segment vectors;

using singular value decomposition to decompose said data matrix to create said trained matrices; and reducing the dimensions in said trained matrices.

41. The storage medium of claim 40 wherein the method step of generating a data matrix comprises the steps of:

creating a data matrix using said first set of text object vectors as a first dimension and said first set of segment vectors as a second dimension; and applying a weighted value to each cell in said data matrix.

42. The storage medium of claim 41 wherein the method step of creating a data matrix further comprises the steps of:

parsing said at least one standard text into a second set of text object vectors and a second set of segment vectors; and including in said data matrix said second set of text object vectors in said first dimension and said second set of segment vectors in said second dimension.

43. The storage medium of claim 34 wherein the method step of determining a degree of similarity comprises the steps of:

generating a pseudo-object vector representation of said ungraded sample text;

computing a vector representation for said at least one standard text;

comparing said pseudo-object vector representation and said vector representation; and assigning a grade to said ungraded sample text based on said comparison.

44. The storage medium of claim 43 wherein the method step of generating a pseudo-object vector representation comprises the steps of:

parsing said ungraded sample text into a first set of text object vectors; and computing the average of said first set of text object vectors by averaging the sum of each text object vector element of each of said first set of text object vectors in accordance with said trained matrices.

45. The storage medium of claim 43 wherein the method step of computing a vector representation comprises the steps of:

parsing said at least one standard text into a first set of text object vectors; and computing the average of said first set of text object vectors by averaging the sum of each text object vector element of each of said first set of text object vectors in accordance with said trained matrices.

* * * * *